United States Patent [19]
Kauskey

[11] Patent Number: 6,062,452
[45] Date of Patent: May 16, 2000

[54] GROCERY BOARD

[76] Inventor: Michael L. Kauskey, 1826 S. Elm Ave., Broken Arrow, Okla. 74012

[21] Appl. No.: 09/221,369

[22] Filed: Dec. 28, 1998

[51] Int. Cl.$^7$ ...................................................... B60R 9/00
[52] U.S. Cl. .......................... 224/539; 224/402; 224/403; 224/925; 296/37.1; 296/37.6
[58] Field of Search .................................... 224/539, 311, 224/402, 403, 542, 925; 220/529, 542, 553; 296/37.1, 37.16, 37.6; 211/12, 70.1, 72, 73, 94.01

[56] References Cited

U.S. PATENT DOCUMENTS

| | | | |
|---|---|---|---|
| 4,305,695 | 12/1981 | Zachrich | 414/522 |
| 4,917,429 | 4/1990 | Giger . | |
| 5,094,375 | 3/1992 | Wright . | |
| 5,167,479 | 12/1992 | Bott . | |
| 5,234,116 | 8/1993 | Kristinsson et al. . | |
| 5,366,189 | 11/1994 | Thompson . | |
| 5,464,102 | 11/1995 | LeBlanc et al. . | |
| 5,484,091 | 1/1996 | Malinowski et al. . | |
| 5,526,972 | 6/1996 | Frazier et al. . | |
| 5,628,442 | 5/1997 | Wayne | 224/543 |
| 5,845,951 | 12/1998 | Webb | 294/159 |
| 5,845,953 | 12/1998 | Rusnock | 296/37.6 |

FOREIGN PATENT DOCUMENTS

| | | | |
|---|---|---|---|
| 3238908 | 4/1984 | Germany | 224/925 |
| 2169877 | 7/1986 | United Kingdom | 224/925 |
| 2249767 | 5/1992 | United Kingdom | 224/925 |

*Primary Examiner*—Gregory M. Vidovich
*Assistant Examiner*—Maerena W. Brevard
*Attorney, Agent, or Firm*—Molly D. McKay

[57] ABSTRACT

A board that removably secures by its ends to opposite sidewalls of a vehicle so that a top side of the board faces upward when the board is secured in the vehicle. Tracks that have spaced apart parallel lips may be secured to the sidewalls of the vehicle to removably receive the ends of the board for those vehicles that do not have grooves in their sidewalls for receiving the ends. Upwardly extending projections are provided on the top side of the board for securing handles of grocery bags to the board. Openings are provided in the board below the top side. An upright member is provided between and serves to separate adjacent openings so that securing means, such as ropes, can be inserted through the openings and fastened to the upright members in order to secure items to the board.

An alternate embodiment of the board is provided with one end that moves longitudinally in order to shorten or lengthen the board.

8 Claims, 2 Drawing Sheets

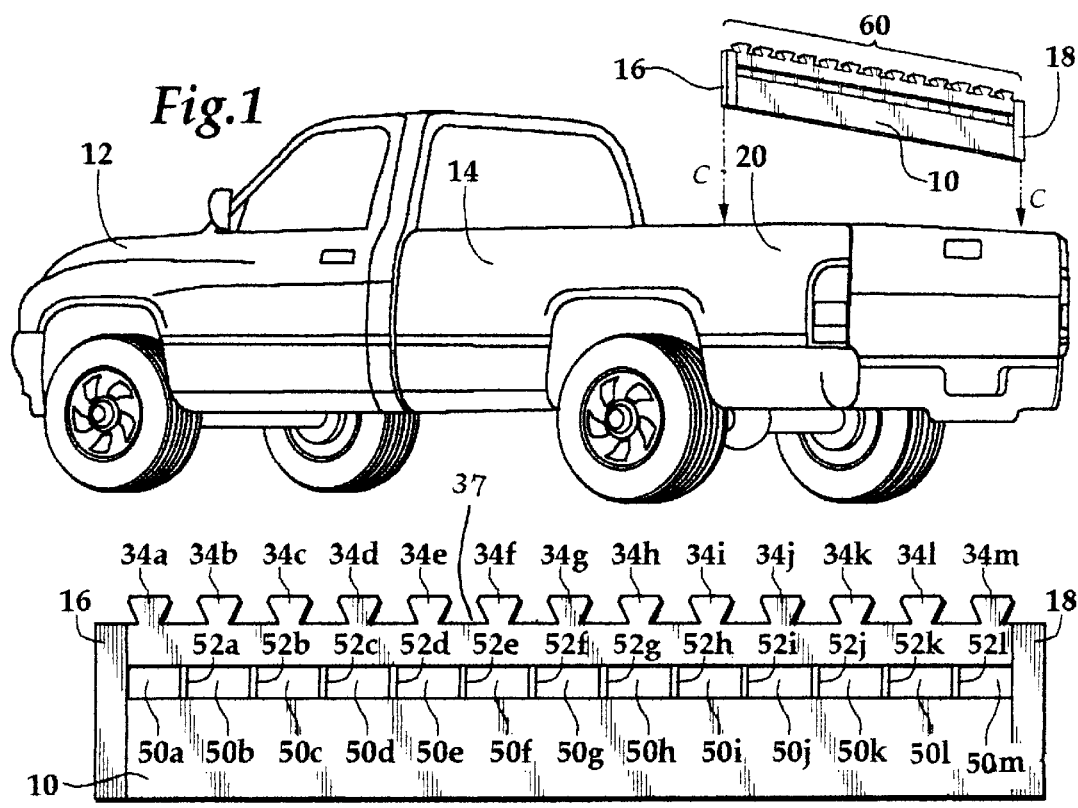
Fig.1
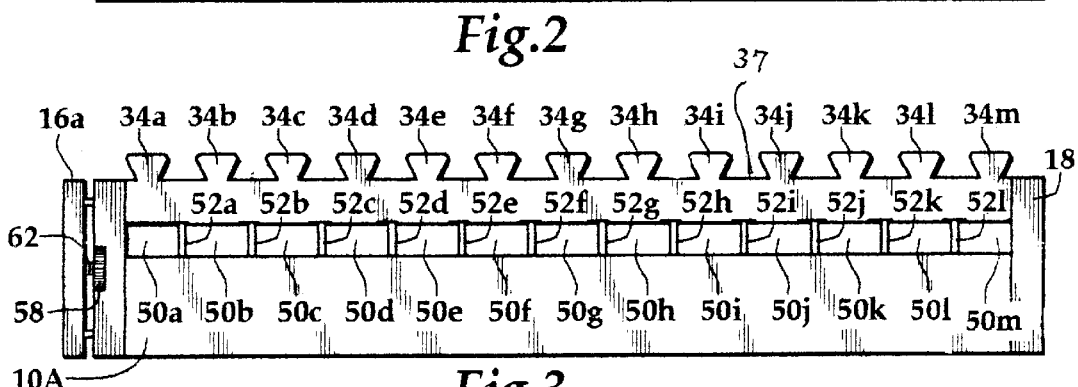
Fig.2
Fig.3
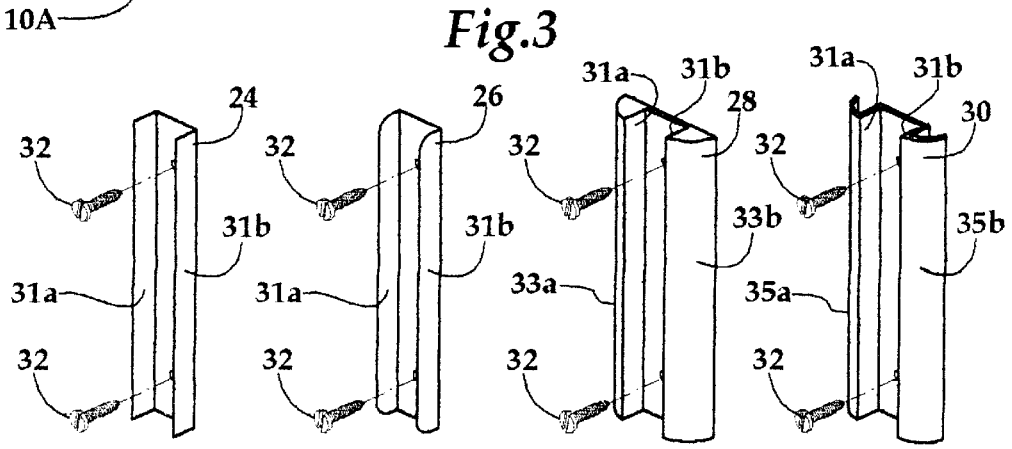
Fig.4A  Fig.4B  Fig.4C  Fig.4D

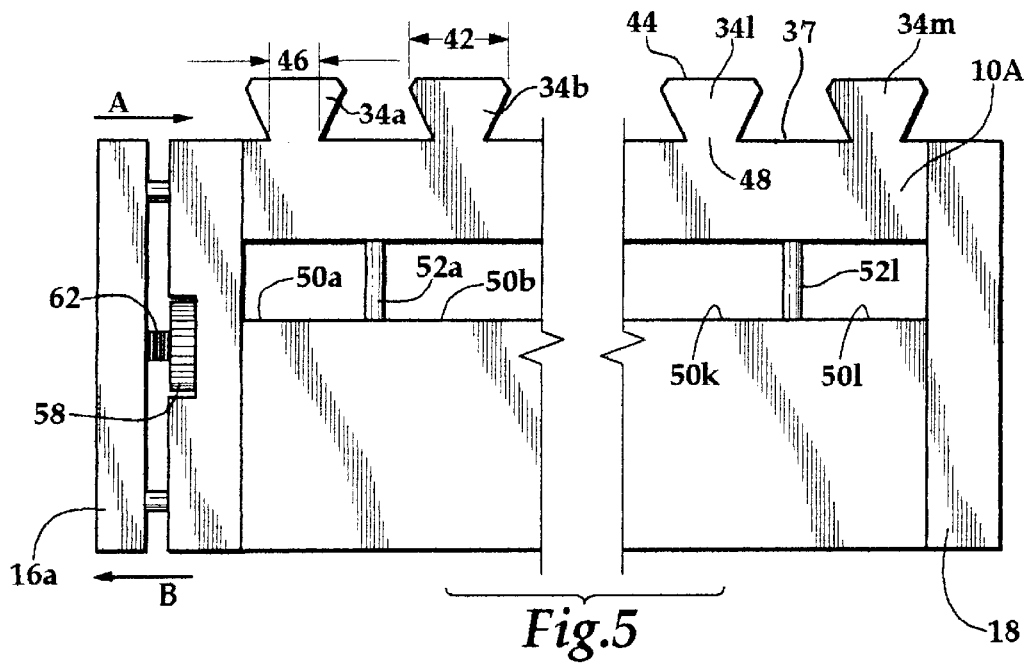
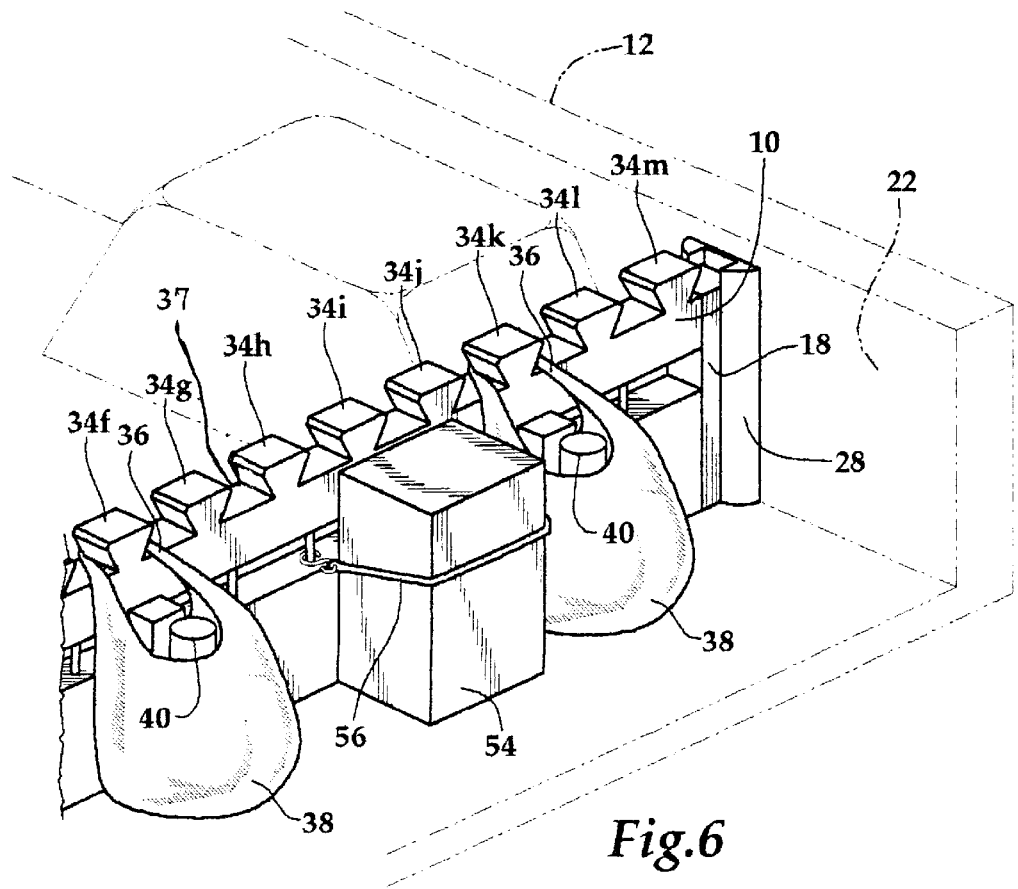

GROCERY BOARD

BACKGROUND OF THE INVENTION

1. Field of the Invention

The present invention relates to a board or plank that inserts into a vehicle and is used to transport groceries and other items within the vehicle while holding the items being transported securely to the board. The board is provided with upwardly extending projections on its top side and handles of a grocery bag may be placed around these projections in order to hold the grocery bag upright during transport. The board is also provided with openings that are separated by upright members. An item that does not have handles may be secured to the board via ropes or straps that extend through the openings and engage both the item and at least one of the upright members, thus securing the item to the board. An alternate embodiment of the board is provided with one adjustable end. The adjustable end can be moved longitudinally outward from or longitudinally inward toward the opposite end to allow the alternate board to be adjusted in length to fit a variety of different sizes of vehicles and to facilitate insertion and removal of the alternated board from a vehicle.

2. Description of the Related Art

A variety of devices have been made in order to allow a person to transport items, such as bags of groceries, in a vehicle in such a way that the items do not move around within the vehicle. However, most of these devices are designed to provide an enclosure in which the items being transported may be contained during transport. One of the problems with such enclosures is that even when items are placed within an enclosure provided within a vehicle, items such as bags of groceries can tip over and the contents of the bags may be spilled within the enclosure.

Another problem with an enclosure is that the enclosure does not hold the items stationary relative to the vehicle. Thus, when the vehicle turns a corner or quickly stops or starts, the items are often damaged as they are flung from one side of the enclosure to another. In the case of a bag of groceries, such uncontrolled movement within an enclosure can spill and damage fragile items, such as eggs, bread or produce.

Still other devices are designed to one or more upright members for securing items within the vehicle. Some of these items do not secure to the vehicle, and thus, these devices can move within the vehicle when the vehicle turns a corner or quickly stops or starts. These unsecured devices can also tip over and spill the contents of items such as bags of groceries that are secured thereto. Such movement of the upright member within a vehicle can result in damage to fragile items that are secured to the upright member.

For those devices that are provided with upright member and are secured to the vehicle, many are permanently attached to the vehicle and remain in place within the vehicle even when not in use. On the other hand, those devices that are removably secured within the vehicle are often difficult to remove from the vehicle and are large and awkward to store.

The present invention addresses these problems by providing a device that has upwardly extending projections and has openings separated by upright members within the device for positively securing a wide range of items to the device. The present invention is a device that removably secures to the vehicle and holds items tightly thereto to prevent undesirable movement of the items relative to the vehicle. The present invention is a device that can be quickly and easily attached to or removed from a vehicle. Finally, the present invention is a straight, flat, one-piece device that can be stored in a small space when it is removed from the vehicle.

SUMMARY OF THE INVENTION

The present invention is a one-piece board that removably installs in a vehicle, such as for example the bed of a pickup truck. The board is provided with opposite ends that secure to opposite sidewalls of the vehicle. The ends secure to the vehicle either by being removably received in grooves already present in the vehicle or by being removably received in tracks that can be secured via screws, or other suitable fasteners, to opposite sidewalls of those vehicles that are not provided with grooves.

A top side of the board is provided with upwardly extending projections. The projections are capable of receiving handles of grocery bags in order to hold the grocery bags upright within the vehicle, to prevent the contents of the grocery bags from spilling out of the bags, and to prevent the grocery bags and their contents from moving about within the vehicle.

The board is also provided with several openings located below the upwardly extending projections. Upright members provided in the board separate adjacent openings. These openings and upright members allow the user to secure items to the board with securing means such as straps, rope or cords for those items that do not have handles to allow them to be secured over the upwardly extending projections.

The board also provides the capability to divide the cargo compartment, affording protection to compartment contents from impact due to shifting cargo.

The board is optionally provided with an adjustable end as one of the opposite ends of the board. The adjustable end is adjustable longitudinally inward and outward to effectively shorten or lengthen the board so that it can fit a variety of different sizes of vehicles and to facilitate insertion of the alternate board into and to facilitate removal of the alternate board from vehicles. The adjustable end may be provided with a thumbwheel that engages a threaded screw provided between the board and the adjustable end or may be provided with another similar means of adjusting the length of the board. If a thumbwheel is provided, rotating the thumbwheel causes the adjustable end to move either further away from its opposite, non-movable end or closer to its opposite, non-movable end, depending on the direction of rotation of the thumbwheel.

BRIEF DESCRIPTION OF THE DRAWINGS

FIG. 1 is a perspective view of a grocery board constructed in accordance with a preferred embodiment of the present invention, shown being inserted into the bed of a vehicle.

FIG. 2 is a front plan view of the grocery board of FIG. 1.

FIG. 3 is a front plan view of an alternate embodiment of the grocery board.

FIG. 4A is a perspective view of a first type of track for use with the grocery board as a means of removably securing the grocery board in a vehicle.

FIG. 4B is a perspective view of a second type of track for use with the grocery board as a means of removably securing the grocery board in a vehicle.

FIG. 4C is a perspective view of a third type of track for use with the grocery board as a means of removably securing the grocery board in a vehicle.

FIG. 4D is a perspective view of a fourth type of track for use with the grocery board as a means of removably securing the grocery board in a vehicle.

FIG. 5 is an enlarged, partially cut-away view of the alternate embodiment grocery board of FIG. 3.

FIG. 6 is a perspective view of the grocery board of FIG. 1, shown in use within a vehicle.

DETAILED DESCRIPTION OF THE PREFERRED EMBODIMENT INVENTION

Referring now to the drawings and initially to FIGS. 1, 2 and 6, there is illustrated a one-piece grocery board 10 constructed in accordance with a preferred embodiment of the present invention. The grocery board 10 removably secures within a vehicle 12, such as for example in the bed 14 of a pickup truck, as illustrated in FIG. 1.

The board 10 is provided with opposite ends 16 and 18 that secure to opposite sidewalls 20 and 22 of the vehicle 12, either in grooves (not illustrated) provided in the sidewalls 20 and 22 of some makes of vehicles 12, or in tracks 24 26, 28, or 30 that can be secured via screws 32, or other suitable fasteners, to the opposite sidewalls 20 and 22 of those vehicles 12 that are not provided with grooves (not illustrated). As illustrated by Arrows C in FIG. 1, the board 10 may be inserted into vehicle 12 by lowering the board 10 into vehicle 12 so that the ends 15 16 and 18 slide into either grooves (not illustrated) provided on the vehicle 12 or into tracks 24 26, 28, or 30. To remove the board 10 from the vehicle 12, the board 10 is raised upward to disengage the ends 16 and 18 from the grooves (not illustrated) or the tracks 24 26, 28, or 30.

Referring now to FIGS. 4A, 4B, 4C, and 4D, tracks 24 26, 28, or 30 are illustrated. Tracks 24 26, 28, or 30 are similar to each other in that each is provided with two vertical, parallel, and outwardly extending lips 31a and 31b that are separated a sufficient distance from each other in order to admit one end 16, 16a or 18 of the board 10 between each corresponding pair of lips 31a and 31b. The first type of track 24 is provided with square ends on the lips 31a and 31b. The second type of track 26 is provided with rounded ends on the lips 31a and 31b. The third type of track 28 is provided with solid, rounded shoulders 33a and 33b adjacent, respectively, the lips 31a and 31b. The solid, rounded shoulders 33a and 33b provide more support and strength to the track 28. The fourth type of track 30 is provided with hollow, rounded shoulders 35a and 35b adjacent, respectively, to the lips 31a and 31b. The hollow, rounded shoulders 35a and 35b also provide added support and strength to the track 30.

The board 10 is provided with upwardly extending projections 34a, 34b, 34c, 34d, etc. located on a top side 37 of the board 10. The upwardly extending projections 34a, 34b, 34c, 34d, etc. are capable of receiving handles 36 of grocery bags 38 in order to hold the grocery bags 38 upright within the vehicle 12, to prevent the contents 40 of the grocery bags 38 from spilling out of the bags 38 and to prevent the grocery bags 38 and their contents 40 from moving about within the vehicle 12. The upwardly extending projections 34a, 34b, 34c, 34d, etc. each preferably have a width 42 at their uppermost end 44 that is greater than the width 46 at the lower or base end 48 of the upwardly extending projections 34a, 34b, 34c, 34d. With the upwardly extending projections 34a, 34b, 34c, 34d, etc. being wider at their uppermost ends 44, handles 36 of grocery bags 38 that are placed over the upwardly extending projections 34a, 34b, 34c, 34d, etc. are retained thereon by the force of gravity.

The board 10 is also provided with several openings 50a, 50b, 50c, 50d, etc. located below the upwardly extending projections 34a, 34b. 34c, 34d, etc. The board 10 is provided with upright members 52a, 52b, 52c, 52d, etc. such that one upright member 52a, 52b, 52c, 52d, etc. is located between each pair of adjacent openings 50a, 50b, 50c, 50d, etc. These openings 50a, 50b, 50c, 50d, etc. and upright members 52a, 52b, 52c, 52d, etc. allow the user to secure items 54 to the board 10 with securing means 56, such as for example, straps, rope or cords, for those items 54 that do not have handles 36 to allow them to be secured over the upwardly extending projections 34a, 34b. 34c, 34d, etc. These items 54 are secured to the board 10 by inserting the securing means 56 through one or more openings 50a, 50b, 50c, 50d, etc. and around both the item 54 and at least one of the upright members 52a, 52b, 52c, 52d, etc.

Referring now to FIGS. 3 and 5, an alternate embodiment board 10a is illustrated. The alternate embodiment board 10a is provided with an adjustable end 16a as a replacement for end 16 of the board 10. The adjustable end 16a is adjustable longitudinally in an inward direction, as illustrated by arrow A in FIG. 5, and is adjustable longitudinally outwardly, as illustrated by arrow B in FIG. 5. This movement effectively shortens or lengthens the alternate board 10a so that the alternate board 10a can fit a variety of different sizes of vehicles 12.

The adjustable end 16a is provided with a thumbwheel 58 or other similar means for adjusting a length 60 of the alternate board 10a. As illustrated in FIG. 5, the thumbwheel 58 rides on a threaded rod 62 which extends outward to and engages the alternate board 10a on one end of the rod 62 and extends outward to and engages the movable adjustable end 16a on an opposite end of the rod 62. Thus, by rotating the thumbwheel 58, the adjustable end 16a either moves further away from its opposite, non-movable end 18 or moves closer to its opposite, non-movable end 18, depending on the direction of rotation of the thumbwheel 58.

Another reason why it is desirable to be able to adjust the length 60 of the alternate board 10a is to facilitate installation and removal of the alternate board 10a from a vehicle 12. Installation of the alternate board 10a is made easier by decreasing the board's length 60. The board's length 60 id decreased by rotating the thumbwheel 58 in one direction so that the movable end 16a moves in the direction of Arrow A, as illustrated in FIG. 5. By shortening the length 60 of the alternate board 10a, the ends 16a and 18 of the alternate board 10a can be more easily inserted into the grooves (not illustrated) or the tracks 24 26, 28, or 30 as the alternate board 10a is lowered into the vehicle 12. Once the ends 16a and 18 of the alternate board 10a are located within the grooves (not illustrated) or the tracks 24 26, 28, or 30, the thumbwheel 58 is then rotated in an opposite direction in order to increase the length 60 of the alternate board 10a. As the length 60 of alternate board increases, the ends 16a and 18 of the alternate board 10a are tightened against the vehicle 12. In order to remove the alternate board 10a from the vehicle 12, this procedure is reversed, and the alternate board 10a is raised up out of the grooves (not illustrated) or the tracks 24 26, 28, or 30.

While the invention has been described with a certain degree of particularity, it is manifest that many changes may be made in the details of construction and the arrangement of components without departing from the spirit and scope of this disclosure. It is understood that the invention is not limited to the embodiments set forth herein for the purposes of exemplification, but is to be limited only by the scope of the attached claim or claims, including the full range of equivalency to which each element thereof is entitled.

What is claimed is:

1. A board for transporting groceries and other items that removably installs in a vehicle comprising a board having a first end and an opposite second end, said first end removably attach able to one sidewall of a vehicle and said second end removably attach able to an opposite sidewall of the vehicle so that a top side of the board faces upward when both the first and second ends of the board are attached to the vehicle, wherein said first end of said board is movable longitudinally in a direction toward said second end of said board in order to shorten or lengthen said board, means for securing grocery bags being provided on the top side of said board, and said board being provided with openings located below said means for securing grocery bags so that securing means may insert through the openings in order to secure items to said board.

2. A board according to claim 1 further comprising one upright member being provided between each adjacent opening in the board so that securing means may attach to the upright members in order to secure items to said board.

3. A board according to claim 2 further comprising

A pair of tracks for securing to sidewalls of a vehicle to removably receive said first and said second ends of said board.

4. A board according to claim 1 wherein said means for securing grocery bags further comprises upwardly extending projections, each said projection having an uppermost end that extends upward from the board and having a base end that secures to the top side of the board, the uppermost end of each said projection having a width that exceeds a width of the base end of the projection so that handles of grocery bags that are placed over a projection will be retained thereon.

5. A device for securing items within a vehicle comprising a vertical plank having a first end and an opposite second end, means for securing said first end to a first sidewall of a vehicle, means for securing said second end to a second sidewall of said vehicle, upwardly extending projections provided on a top side of the plank for receiving and retaining handles of grocery bags, wherein said first end of said plank is movable longitudinally in a direction toward said second end of said plank and movable longitudinally in an opposite direction away from the second end in order to decrease or increase the length of said plank; and openings that are separated from each other by upright members that are provided on the plank to allow securing means to be fastened through said openings and around upright members to secure items to the plank.

6. A device according to claim 5 wherein said means for securing said first end to a first sidewall of a vehicle and said means for securing said second end to a second sidewall of a vehicle further comprise a first track for securing to a first sidewall and a second track for securing to a second sidewall, each of the tracks being provided with parallel lips for removable receiving an end of said plank between the parallel lips provided on the track.

7. A device according to claim 9 further comprising one end of a threaded screw attaching to said first end of the plank and an opposite end of the threaded screw attaching to said plank, a thumbwheel movably engaging a threaded screw so that the first end of the plank moves longitudinally relative to the plank as the thumbwheel is rotated on the threaded screw.

8. A board that compartmentalizes and forms a barrier within a cargo area in a vehicle comprising a board having a first end removably attaching to one sidewall of a vehicle and an opposite second end removably attaching to an opposite sidewall of the vehicle, wherein said first end of said board is movable longitudinally in a direction toward said second end of said board in order to shorten or lengthen said board, upwardly extending projections provided on a top side of said board, each said projection having an uppermost end that extends upward from the board and having a base end that secures to the top side of the board, the uppermost end of each said projection having a width that exceeds a width of the base end of the projection, and said board being provided with openings located below said projections.

* * * * *